United States Patent

Winters

[11] 3,755,669
[45] Aug. 28, 1973

[54] HOT BOX ACTUATED AND DETECTING BRAKE AIR LINE VENT

[75] Inventor: Kenneth W. Winters, Morgantown, W. Va.

[73] Assignee: Maurice J. Flynn, Henry L. Max & Charles F. Albright, Flynn, Max and Albright, all of Huntington, W. Va.; part interest to each

[22] Filed: May 17, 1971

[21] Appl. No.: 144,178

[52] U.S. Cl. .............................. 246/169 A, 303/1
[51] Int. Cl. ............................................. B61k 9/04
[58] Field of Search .............................. 303/18, 1; 246/169 A; 137/467

[56] References Cited
UNITED STATES PATENTS

| | | | |
|---|---|---|---|
| 2,588,204 | 3/1952 | Cameron et al. | 246/169 A |
| 2,641,689 | 6/1953 | Poitras | 246/169 A |
| 2,736,796 | 2/1956 | Hebert | 246/169 A |
| 2,973,429 | 2/1961 | Clark et al. | 246/169 A |

Primary Examiner—Milton Buchler
Assistant Examiner—D. C. Butler
Attorney—Clarence A. O'Brien and Harvey B. Jacobson

[57] ABSTRACT

A fusible plug closed vent line for the "Westinghouse Brake System" of a railway car and having a pressure differential actuated control valve operatively associated therewith and responsive to a reduction in air pressure downstream from the control valve to shift the latter from a closed position to an open position for free venting of the associated "Westinghouse Brake System" upon a reduction of air pressure in the vent line downstream from the control valve as would occur when one or more of the fusible plugs closing the vent line downstream from the control valve are melted. The control valve includes an exteriorly disposed actuator that may not only be operated to close the control valve, but also indicates, in a visual manner, when the control valve has been shifted to the open position.

8 Claims, 6 Drawing Figures

Kenneth W. Winters
INVENTOR.

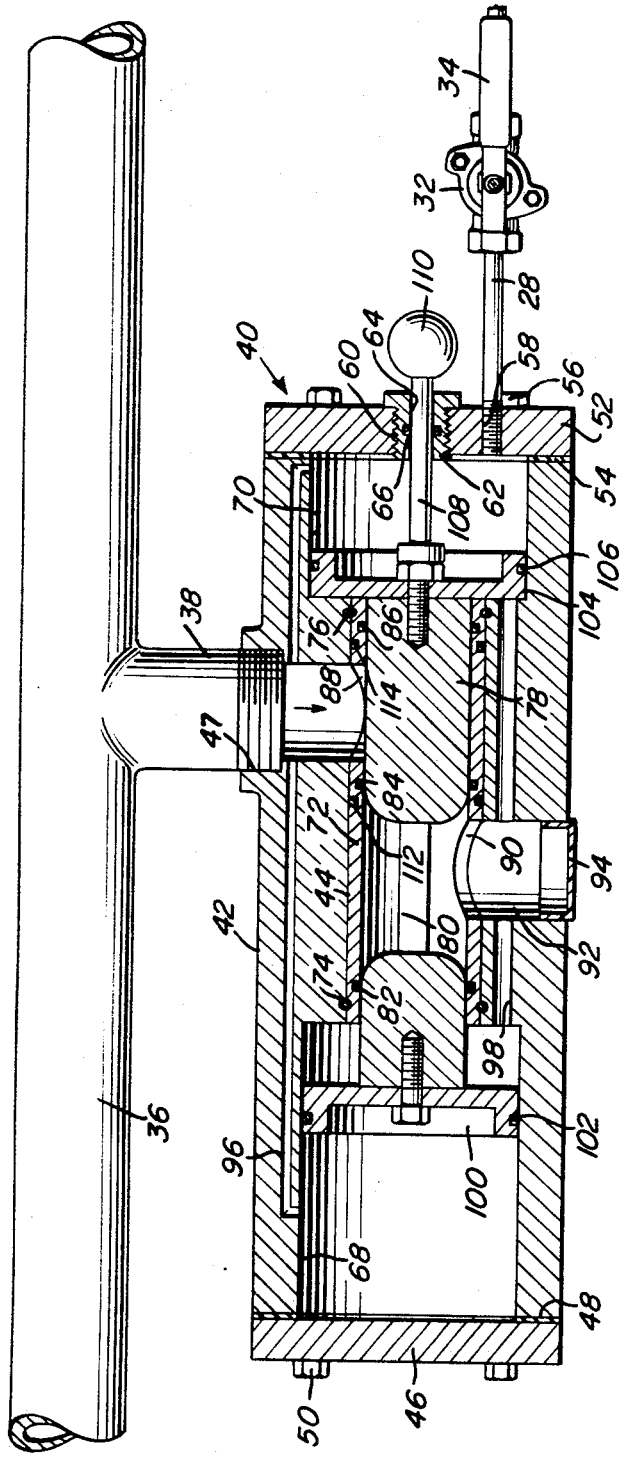
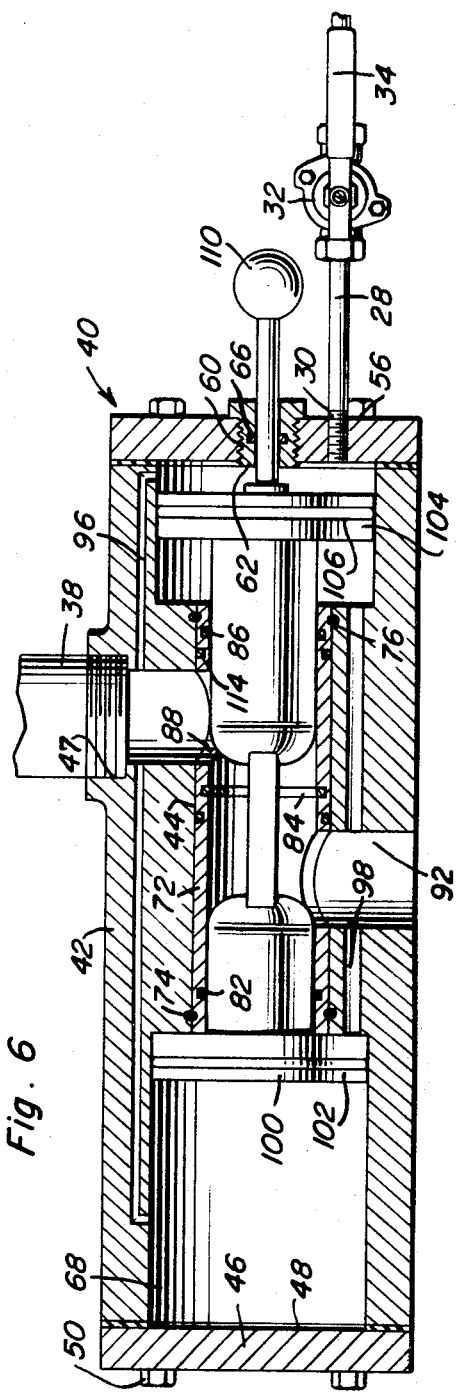
Fig. 5
Fig. 6
Kenneth W. Winters
INVENTOR.

HOT BOX ACTUATED AND DETECTING BRAKE AIR LINE VENT

The air brake line venting system of the instant invention has been primarily designed to provide a fail-safe means of rapidly venting a "Westinghouse Brake System" of a railway car in response to an associated fusible plug of a small diameter vent line and disposed in good heat transfer relation with a wheel axle journal portion being melted in response to excessive heating of that wheel axle portion. The system includes a pressure differential actuated main control valve which is operative to sense the pressure differential which occurs when the small diameter vent line is vented to the ambient atmosphere due to melting of one of the associated fusible closure plugs. Actuation of the control valve results in a large diameter and free flowing portion of the vent line disposed upstream from the closure plug being freely vented to the ambient atmosphere for application of the associated "Westinghouse Brake System" and movement of the control valve to an open position causes the shifting of an exteriorly disposed manual actuator for the control valve and thus renders a readily visible indication of which control valve of a railway train has been vented after the train has been stopped by automatic actuation of the "Westinghouse Brake System."

Although the control valve of the system is operative to freely vent the associated brake system to the ambient atmosphere, the internal components of the control valve are maintained in a static condition sealed from the ambient atmosphere until such time as the control valve is actuated for venting the associated brake system to the atmosphere and the control valve may subsequently be readily visually detected as the valve that has been opened and reset as well as sealed relative to the ambient atmosphere after the necessary repairs have been made.

The main object of this invention is to provide a highly dependable system for venting a "Westinghouse Brake System" of a railway train to the ambient atmosphere in response to one of the journal portions for the wheel axles of the train being excessively heated.

Another object of this invention, in accordance with the immediately preceding object, is to provide a venting system which may be readily adapted to all present forms of "Westinghouse Brake Systems."

A further object of this invention is to provide a control valve in accordance with the preceding objects and which will render a readily visible indication of when the valve has been actuated.

Still another object of this invention is to provide a control valve which may be readily reset and sealed relative to the ambient atmosphere.

Another important object of this invention is to provide a control valve in accordance with the preceding objects which will have all of its working components maintained in a static condition until the control valve is actuated upon the sensing of the requisite pressure differential.

A final object of this invention to be specifically enumerated herein is to provide a "Westinghouse Brake System" thermally controlled vent valve in accordance with the preceding objects which will conform to conventional forms of manufacture, be of simple construction and automatic in operation so as to provide a device that will be economically feasible, long lasting and trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
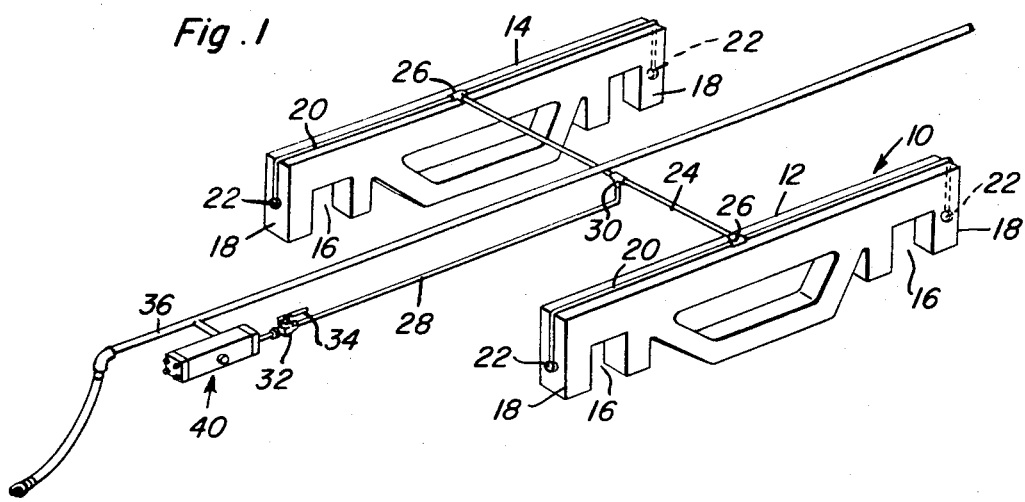
FIG. 1 is a fragmentary perspective view of a portion of a conventional form of "Westinghouse Brake System" with the control valve of the instant invention operatively associated therewith.
Figure 2:
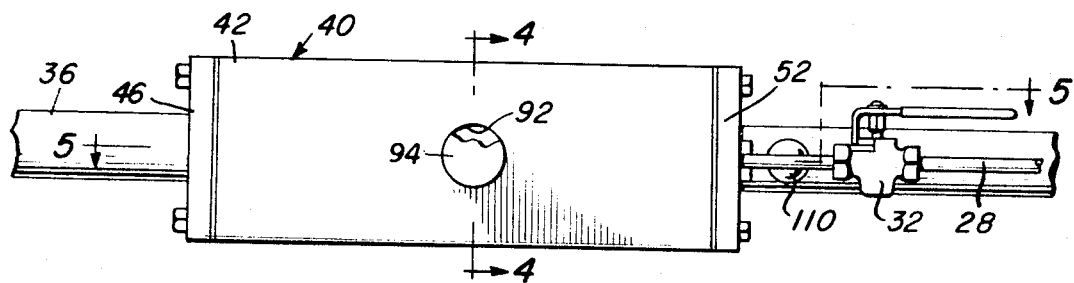
FIG. 2 is a side elevational view of the control valve illustrated on somewhat of an enlarged scale.
Figure 3:
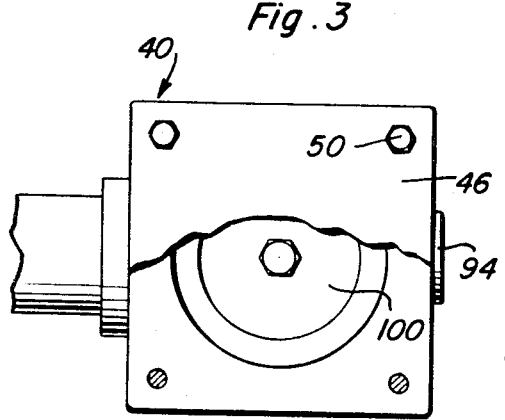
FIG. 3 is an end elevational view of the control valve as seen from the left side of FIG. 2 and with a portion of the near end wall of the valve being broken away.
Figure 4:
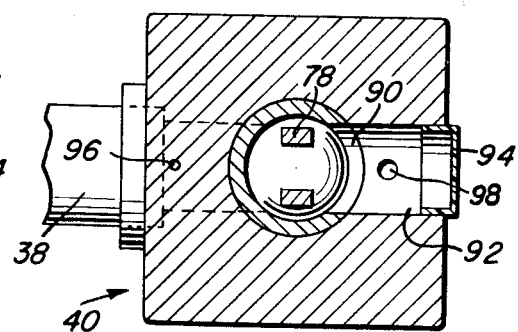
FIG. 4 is a transverse vertical sectional view taken substantially upon the plane indicated by the section line 4—4 of FIG. 2.

FIG. 5 is an enlarged fragmentary horizontal sectional view taken substantially upon the plane indicated by the section line 5—5 of FIG. 2.and with the internal components of the control valve illustrated in their static positions ready for actuation of the control valve; and FIG. 6 is a fragmentary horizontal section view similar to FIG. 5 and with the internal components of the control valve in their relative positions after actuation of the control valve and initial venting of the associated "Westinghouse Brake System."

Referring now more specifically to the drawings the numeral 10 generally designates a wheel truck assembly of a conventional railway car and including a pair of opposite side frames 12 and 14 including bearing journal locations 16.

The side frames 12 and 14 include frame portions 18 in good heat transfer relation with the bearing journal locations 16 and each of the side frames 12 and 14 includes a longitudinally extending vent line 20 whose opposite ends are supported from the corresponding frame portions 18 and closed by means of fusible plugs 22. A connecting line 24 has its opposite ends communicated with the central portions of the vent lines 20 via teeth fittings 26 and the outlet end of a header line 28 is communicated with the connecting line 24 intermediate its opposite ends via a teeth fitting 30. The inlet end of the header line 28 is externally threaded as at 30 and the header line 28 has a manually operable control valve 32 disposed therein including an oscillatable actuating handle 34.

A main supply line 36 is provided and extends longitudinally of the associated train car and has a branch line 38 opening thereinto at its inlet end. A branch line 38 may be provided for each truck assembly of the train car and the control valve of the instant invention is referred to in general by the reference numeral 40 and includes an elongated valve housing 42 having a longitudinal bore 44 formed therethrough and an internally threaded lateral inlet opening 47 into which the outlet end of the associated branch line 38 is threaded.

With attention now invited to FIGS. 5 and 6 of the drawings it may be seen that the left end of the housing 42 is closed by means of a removable end wall 46 and gasket 48 interposed between the end wall 46 and the adjacent end of the housing 42, the end wall 46 being secured in position over the end of the housing 42 by means of removable threaded fasteners 50. Also, the right hand end of the housing 42 is closed by means of a similar end wall 52 and gasket 54. The end wall 52 is removably secured in position by means of threaded fasteners 56 and the end wall 52 is provided with an internally threaded outlet opening 58 into which the inlet end of the header line 28 is threaded. In addition, the end wall 52 includes a central threaded bore 60 in which a tubular fitting 62 is removably threadedly engaged, the fitting 62 having a smooth bore 64 formed therethrough provided with an O-ring groove in which an O-ring seal 66 is disposed.

The longitudinal bore 44 is provided with a counter-bore 68 in the left hand end of the housing 42 and a counter-bore 70 in the right hand end of the housing 42. Further, the bore 44 has a cylinder sleeve 72 secured therein by means of snap rings 74 and 76 and a piston rod 78 is reciprocal through the sleeve 72 and includes a diametrically reduced intermediate portion 80. The left hand end of the piston rod 78 is sealed relative to the internal surfaces of the sleeve 72 by means of an O-ring seal 82 carried by the sleeve 72 and the right hand end of the piston rod 78 is sealed relative to the sleeve 72 by means of O-ring seals 84 and 86 disposed on opposite sides of the inlet opening on neck 46. The sleeve 72 has an opening 88 in one side thereof registered with the opening 47 and an opening 90 in the diametrically opposite side thereof and axially spaced along the sleeve 72 from the opening 88 registered with a lateral outlet port 92 opening outwardly of the side of the housing 42 remote from the side thereof outwardly through which the inlet port or opening 47 opens. The outlet end of the outlet port 72 is closed by means of a pop-out type plug 94.

The remote ends of the counter-bores 68 and 70 are communicated by means of a bipass passage 96 extending longitudinally of the housing 42 and opening into the inlet opening or port 47. In addition, the adjacent ends of the counter-bore 68 and 70 are communicated by means of a pressure equalizing passage 98 extending longitudinally of the housing 42 and opening into the outlet port 92. A diametrically enlarged piston head 100 is disposed within the counter bore 68 and is provided with a sealing ring 102 while a diametrically enlarged piston head 104 is disposed in the counter-bore 70 and provided with a sealing ring 106. In addition, an operating rod 108 is slidingly received through the bore or opening 64 in the fitting 62 carried by the end wall 52 and has one end thereof secured to the piston head 104 and the adjacent end of the piston rod 78 while the other end of the rod 108 projects outwardly through the fitting 62 and is provided with a handle knob 110, the counterbore 70 and the piston 104 being slightly larger in diameter than the counterbore 68 and piston 100, whereby the effective cross-sectional area of the piston 104, exclusive of the rod 108, is equal to the cross-sectional area of the piston 100.

The sleeve 72 is sealed relative to the bore 44 on opposite sides of the inlet port or opening 47 by means of sealing rings 112 and 114. It may therefore be seen that although the main supply line 36 may have air under pressure therein no air pressure can build up behind the adjacent sides of the piston heads 102 and 104. However, the air pressure within the supply line 36 is vented to the remote sides of the piston heads 100 and 104 due to the bipass passage 96. Also, the main supply line air pressure is also vented into the header line 28, the connecting line 24 and the vent lines 20.

In operation, and assuming that the main supply line 36 has air pressure therein and the fusible plugs 22 are intact, when the piston rod 78 is in the position thereof illustrated in FIG. 5 of the drawings the control valve 40 is inoperative to vent the supply line pressure to the ambient atmosphere. However, when one of the frame portions 18 is heated sufficiently due to an overheated adjacent journal for a wheel axle, the fusible plug 22 supported therefrom will melt thus venting the corresponding end of the associated vent line 20. This of course will also cause the connecting line 24 and the header line 28 to be vented so as to reduce the pressure within the counter-bore 70 whereupon a differential in pressure will exist on the remote sides of the piston heads 100 and 104 with the higher pressure being exerted on the piston head 100 in order to shift the piston rod 78 to the right from the position thereof illustrated in FIG. 5 of the drawings to the limit position thereof defined by the abutment of the piston head 100 with the inner end of the counter-bore 68, see FIG. 6. When the piston rod 78 is thus shifted, the end of the piston rod 78 previously registered with the opening 88 is moved out of full registry with the latter so as to vent the inlet port or opening 47 to the outlet port 92 through the diametrically reduced central area of the piston rod. The increase of pressure within the outlet port 92 behind the pop-out plug 94 is sufficient to cause the latter to pop from the outlet port 92 whereupon the main supply line 36 will be freely vented to the ambient atmosphere so as to allow the "Westinghouse Brake System" to be actuated. Of course, during shifting of the piston rod 78 to the right as viewed in FIG. 6 of the drawings, the rod 108 is extended outwardly of the right hand end of the control valve 40 thus rendering a visual indication that the control valve 40 has been opened.

After the associated train has been brought to a stop, workmen moving along the train may readily ascertain that the control valve 40 has been actuated and the associated bearing journal locations 16 may be inspected to locate the hot bearing journal. After suitable repairs have been made to the bearing journal, the control valve 32 is closed and the knob 110 is engaged so as to shift the rod 108 from the position thereof in FIG. 6 of the drawings to the position of FIG. 5 with the control valve 40 in the closed position. Thereafter, a new pop-out plug 94 may be wedged in the outlet port 92 and the main supply line 36 may again have air pressure admitted thereinto for releasing the brakes of the associated train. Of course, prior to pressurizing the supply line 36 the melted plug 22 is also replaced.

It may thus be seen that the control valve 40 has the shiftable components thereof maintained in static position during normal operation of the associated "Westinghouse Brake System" and that the movable components of the control valve 40 are shifted only in response to one of the associated fusible plugs 22 being melted when the main supply line 36 is pressurized.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A train car air brake venting system including a pressurized brake deactivating supply line, a vent line having an inlet end communicated with said supply line and at least one outlet end portion thereof provided with a fusible closure disposed in good heat transfer relation with a wheel axle bearing journal, a line pressure venting control valve including an inlet and an outlet and being serially connected in said vent line, said control valve further including a vent port and a valve member shiftable between first and second positions establishing and terminating, respectively, communication of said vent port with said inlet, said valve member including first and second opposing pressure reactive surfaces for shifting said valve member from said second position to said first position in response to a greater pressure acting upon said first reactive surface, said valve including restrictive flow means communicating said reactive surfaces with the inlet, said outlet being directly communicated with said second reactive surface, whereby a reduction of vent line pressures downstream from said valve will cause a differential of pressure acting upon said reactive surfaces with said first surface having the greater pressure acting thereon to cause said valve member to shift from said second position to said first position establishing communication of said vent port with said flow passage inlet, said control valve further including an elongated valve body having a longitudinal bore formed therethrough, first opening means communicating a first portion of said bore with said inlet, second opening means communicating a second portion of said bore spaced axially along the latter from said first portion with said vent port, said valve member comprising a piston portion reciprocal in said bore establishing and terminating, respectively, communication between said first and second bore portions in said first and second positions of said valve member, the opposite ends of said piston portion defining said reactive surfaces.

2. The combination of claim 1 wherein said vent line, downstream from said outlet of the control valve is more restrictive to the flow of fluids therethrough than said supply line and inlet of said control valve.

3. The combination of claim 1 wherein said vent line, downstream from said outlet of the control valve, includes a manually actuatable flow controlling valve.

4. The combination of claim 3 wherein said fusible closure is of the replaceable type.

5. The combination of claim 1 wherein said piston portion comprises a piston including an axially extending diametrically reduced central portion which is out of registry with at least one of said opening means when said valve member is in said second position and which is at least partially registered with both opening means when said valve member is in said first position.

6. The combination of claim 5 wherein said restrictive flow means comprises a restrictive flow connecting passage communicating the opposite ends of said bore and said inlet.

7. The combination of claim 5 wherein the end of said piston portion defining said second reactive surface includes an axial extension slidingly and sealingly received through the adjacent end of said valve body.

8. The combination of claim 7 wherein said bore comprises the internal surfaces of a sleeve removably secured in said body within a longitudinal bore provided therefor in said body.

* * * * *